United States Patent Office 3,416,633
Patented Dec. 17, 1968

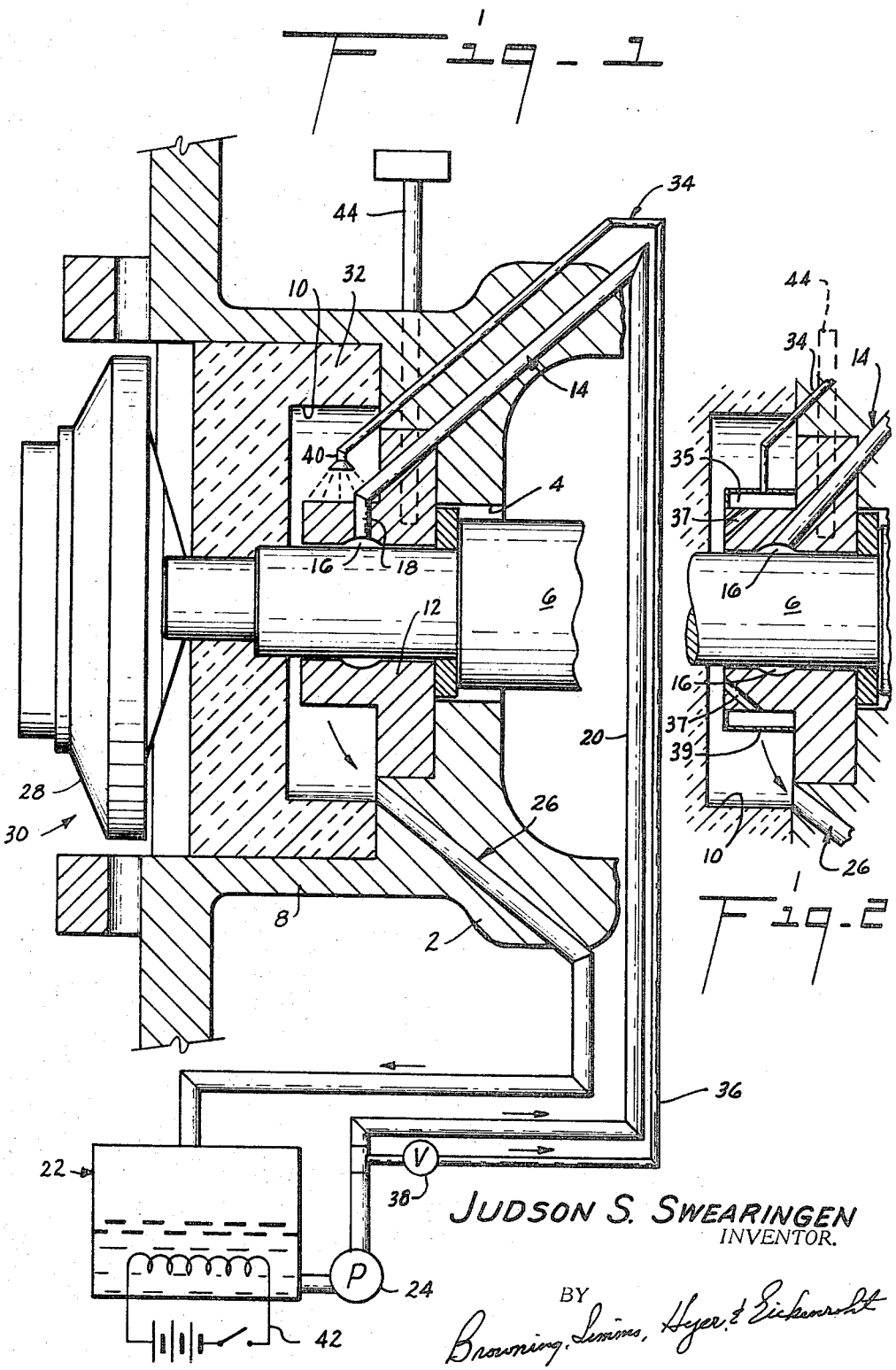

3,416,633
METHOD OF AND APPARATUS FOR PREWARMING A LUBRICATED SHAFT SEAL ASSEMBLY
Judson S. Swearingen, 2235 Carmelina Ave.,
Los Angeles, Calif. 90064
Filed Nov. 8, 1966, Ser. No. 592,805
8 Claims. (Cl. 184—1)

This invention relates to a lubricated shaft seal assembly located adjacent an area which is subject to extremely low temperatures, and more particularly to a novel method and means for prewarming such assembly.

A very common method of lubricating bearings is to provide a supply of lubricating fluid to the area between the bearing and the shaft which is journalled therein. In many cases the lubricated shaft seal assembly is located in a closed chamber and a continuous supply of lubricating fluid is delivered to the bearing surfaces. Excess lubricating fluid flows through the bearing into the chamber and through a lubricant draining system back to a reservoir. Upon shut-down, a certain amount of lubricating fluid tends to remain in the bearing area. In certain types of low temperature machinery in which the lubricated components are located near the cold zones, the lubricating fluid remaining in the bearing area when the machine is shut down will congeal due to the chilling of the shaft. In such cases, it is necessary to uncongeal the lubricating fluid before restarting the machine. For example, turboexpanders, low-temperature centrifugal compressors, and cryogenic machines often have lubricated bearings in a warm zone isolated from the cold zone by a heat barrier and a low-heat conducting section in the shaft. However, if the machine is shut down for a considerable period of time there is conductivity of the heat from the bearing into the cold zone and, especially in cold weather, the bearing may be chilled sufficiently to congeal the lubricating fluid or otherwise reduce its lubricating quality to below acceptable limits. In order to start up such a machine without difficulty it is necessary to have some method of warming the bearing whereby the lubricating fluid will become uncongealed and the lubricating quality will be within acceptable limits.

One conventional way of accomplishing prewarming in such machines is to place an electric heater in a compartment in the metallic mass in heat-conductive contact with the bearing; however, this method may cause difficulty. If the heater is sufficient in capacity to act in a reasonable time then it will overheat and cause damage if, inadvertently, the heater remains on after the lubricating fluid has warmed to acceptable limits. Due to the limited space it is difficult if not impossible to conveniently install a thermostat to automatically control such a heater. Furthermore, the area may be a hazardous one where electrical circuits present problems.

It is an object of my present invention to provide an improved lubricated shaft seal assembly having means to expeditiously warm the lubricating fluid in the bearing sufficiently to uncongeal lubricating fluid in the bearing area.

It is another object to provide an improved method of expeditiously preheating a lubricated bearing prior to initial start-up of a machine having a bearing located in the proximity of a cold zone.

It is a further object of this invention to provide an improved lubricated shaft seal assembly located in the proximity of the cold zone.

In order to accomplish the above objects and other objects and advantages of this invention which will become apparent from the detailed description, the improved lubricated shaft seal assembly is provided with means which will expeditiously warm the congealed lubricating fluid. More specifically, it is comprised of a housing having an aperture and a chamber formed by a flange extending from the housing. The shaft extends through the aperture into the chamber. Material formed of insulating material closes the end of the chamber and forms a heat barrier between the cold zone and the shaft seal. The end of the shaft extends through such heat barrier to the operating mechanism and cold zone. A bearing is positioned about the aperture and the shaft is journalled in the bearing. A lubricant supplying system delivers lubricating fluid to the area between the bearing and the shaft to lubricate the bearing. A lubricant draining system withdraws surplus lubricating fluid from the chamber. The lubricant supplying system and lubricant draining system are connected to a lubricant reservoir forming a closed lubricant system for the bearing. The reservoir is provided with means which will warm the lubricating fluid therein. Except that the lubricant in the bearing may be congealed by low temperature thereby preventing its circulation through the bearing, it would circulate therethrough and keep the bearing warm.

A second lubricant supplying system is provided which, when engaged will deliver warmed lubricating fluid from the reservoir into the chamber and onto the exterior of the bearing. The heated lubricating fluid will warm the exterior of the bearing sufficiently to uncongeal the lubricating fluid contained in the area between the bearing and the shaft. A thermostat or other temperature sensing means may be provided in the proximity of the shaft, although it is pointed out that the oil stream has its own thermostatically controlled heater, so no damage can be done by prolonging the flow of this second supply system. The temperature sensing means will provide an indication as to when the shaft has been sufficiently heated so that the lubricating fluid contained in the area between the bearing and the shaft will have uncongealed and lubricant quality raised sufficiently to permit operation of the machine.

An illustrative embodiment of the invention is set forth in the accompanying drawings in which:

FIG. 1 is a cross section through a lubricated shaft seal assembly constructed in accordance with this invention, the section being taken along the axis of the shaft about which the seal is provided with the shaft along with a rotary member mounted thereon shown in elevation.

As mentioned, the use of a lubricating fluid to lubricate the area between a bearing and a shaft is quite common. However, in certain installations, such as a turboexpander or a low-temperature centrifugal compressor, the lubricated components are located near the cold zones and when such a machine is shut down the heat from the bearing is conducted along the shaft into the cold zone. As a result of such conductivity the bearing may be chilled sufficiently to congeal the lubricating fluid or otherwise reduce the lubricating quality below acceptable limits. In such cases, it is necessary to provide some means of prewarming the lubricating fluid in the bearing prior to restarting the machine. One method of accomplishing this is to initially warm the lubricating fluid in the lubricating fluid reservoir to a predetermined temperature, flow the warmed lubricant over the exterior of the bearing, monitor the temperature of the bearing until the bearing has reached a temperature sufficient to uncongeal the lubricating fluid in the bearing area so that the flow of lubricant through the interior of the bearing is restored, and restart the apparatus. The flow of lubricant over the exterior of the bearing may then be terminated or left flowing.

With such a method the congealed lubricating fluid is expeditiously warmed without danger of overheating the bearing or other critical parts of the apparatus.

Referring now to the drawings, there is shown at 2 a housing having an aperture 4 through which a shaft 6 projects. Extending outwardly from the housing 2 is a flange 8 which encloses a heat insulating mass 32 also surrounding the projecting shaft 6, which forms a chamber 10 surrounding the bearing 12.

Positioned about the aperture 4 is a bearing 12 through which the shaft 6 is journalled. A lubricant supplying system 14 delivers lubricating fluid to an area 16 between the inner diametrical wall of the bearing 12 and the pheripheral wall of the shaft 6. The lubricant supplying system 14 may consist of a passage 18 extending from the outer peripheral wall of the bearing 12 to the inner diametrical wall thereof plus a conduit 20 that extends to the passage 18 from a lubricant reservoir 22. A pump 24 is provided in the conduit 20 assuring the delivery of a positive supply of lubricating fluid to the bearing area 16.

The fit between the shaft 6 and the bearing 12 is such that lubricating fluid after passing through the bearing will flow out into the chamber 10. A lubricant draining system 26 which extends from the chamber 10 to the reservoir 22 will return surplus lubricating fluid to the reservoir 22.

The above described lubricating system for a shaft bearing is very common and works very satisfactorily in most instances. However, if the end of journalled shaft 6 is connected to a device in a cold or cryogenic zone, problems develop. For example, when the apparatus having the shaft 6 is shut down a certain amount of lubricating fluid will remain in the bearing area 16 and, if the seal assembly is located in an area of ambient atmospheric temperature and the end of the shaft in a cryogenic area, there will be a transfer of heat from the shaft. It is not at all uncommon in such circumstances for the shaft to be chilled to a point where the lubricating fluid remaining in the bearing area 16 actually congeals. Under such circumstances, it is necessary to warm the area so that the lubricating fluid becomes uncongealed and of sufficient lubricating quality before restarting the apparatus.

The drawing depicts such a circumstance and illustrates the incorporation of the present invention. As can be seen, the end of the shaft 6 is connected to a turbine wheel 28 which is located in a zone 30 of cryogenic temperature, such as is found in various types of turboexpanders and low-temperature centrifugal compressors.

In such an installation, the lubricated bearing being in a warm zone is usually isolated from the cold or cryogenic zone by a heat barrier 32, which also is utilized to form the chamber 10, and a low-heat conducting shaft. Nevertheless, when such a machine is shut down, there is a conductivity of heat from the bearing 12 into the cold zone 30. Under such circumstances the bearing 12 may be chilled sufficiently to congeal the lubricating fluid or otherwise reduce its lubricating quality below acceptable limits.

Before the machine may be restarted, it is necessary to warm the bearing area 16 so that the lubricating fluid will uncongeal and be of acceptable lubricating quality. To accomplish this an auxiliary lubricant supplying system 34 is provided. The auxiliary lubricant supplying system 34 is comprised of a conduit 36 connectable with the conduit 20 of the main lubricant supplying system 14 by a valve 38. The conduit 36 runs into the chamber 10 where it is provided with a nozzle or distributor 40 to cover maximum surface of the bearing with the warm oil for rapid heat transfer. Alternately, the warm oil from supply system 34, instead of or in addition to flowing over the out surface of bearing 12, may flow through conduits, the lining surface of which is in heat transfer relationship to bearing 12, such as through holes 40a with the supply 34 connected to inlet 34a.

Instead of spraying warm lubricant on the outside of the bearing 12 the lubricant supply system 34 may be connected to a circumferential chamber or jacket 35 surrounding the bearing, see FIG. 2. In such case, the bearing is provided with large radially extending passages 37, the inner end of which communicates with the chamber 35 and the outer end of which communicates with the chamber 10. The chamber 35 is also provided with a restricted orifice 39 to drain all lubricant from the system 34 when it is shut down so that lubricant in system 34 will not coagulate. Accordingly, lubricant flows through system 34, chamber 35 and passages 37 into the chamber 10 and out drain 26. The passages 37, being in heat transfer relationship with the bearing, will warm the bearing and coagulated lubricant in area 16.

The reservoir 22 is provided with an immersible heater 42 or other means which will warm the lubricating fluid.

Accordingly, prior to restarting a cryogenic machine having incorporated the present invention, the heater 42 in the reservoir 22 is energized to raise the temperature of the lubricating fluid in the reservoir to a predetermined degree. The pump 24 is then started and the valve 38 positioned to direct lubricating fluid through the conduit 36 of the auxiliary lubricant supplying system 34. The warmed lubricating fluid flows through the conduit 36 and is distributed by the nozzle 40 onto the exterior of the bearing 12. If desired, several nozzles may be used. The warmed lubricating fluid runs over the exterior surface of the bearing 12 warming the bearing and, consequentially, the congealed lubricating fluid in the bearing area 16. The warmed lubricating fluid runs off the exterior of the bearing 12 into the chamber 10 from where the lubricant drain system 26 returns it to the reservoir 22. It has been found that there is no difficulty in having lubricant draining system taking care of the sprayed lubricating fluid. This is particularly true since it has been found, for example with a closed lubricant system circulating lubricating fluid at the rate of one gallon per minute, that only one-half gallon per minute is needed to expeditiously warm the congealed lubricant.

In order to have a positive indication that the warmed lubricating fluid sprayed by the auxiliary lubricant system 34 has a warming effect, a thermometer, thermocouple or other temperature sensing means 44 is located in the bearing 12 or other zone in thermal contact with it. The temperature sensing means 44 will reflect the extent to which the bearing 12 has been warmed as a result of flowing warmed lubricating fluid on it and thereby provides an indication of the condition of the lubricating fluid in the bearing area 16. When the temperature sensing means 44 provides a positive indication that the lubricating quality of the lubricating fluid is of acceptable standard, thereby assuring that lubricating fluid is flowing through the bearing, the valve 38 may be turned off, although obviously overheating is not possible. At such time, the machine may be restarted without risk of damage to the bearings because of congealed lubricating fluid.

From the foregoing it can be seen that this invention is one well adapted to attain all the ends and objects hereinbefore set forth, together with other advantages which are obvious and which are inherent to the apparatus.

It will be understood that certain features and subcombinations are of the utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, the following is claimed:

1. A lubricated shaft bearing assembly located adjacent an area of extremely low temperatures, said seal assembly comprising: a housing having an aperture and a chamber extending from the housing, the shaft extending through the aperture and into and through the chamber into an area of extremely low temperature; means closing the end of the chamber; a bearing about the aperture, the shaft being journalled in said bearing; a lubricant supplying system delivering lubricating fluid to the area between the bearing and the shaft; a lubricant draining system withdrawing surplus lubricating fluid from the chamber; a lubricant reservoir; means to heat the lubricating fluid in said reservoir; and a second lubricant supplying system delivering warmed lubricating fluid from the lubricant reservoir into the chamber and subjecting the bearing to the warmed lubricating fluid, whereby any congealed lubricating fluid in the area between the bearing and the shaft is warmed, the lubricating fluid from the second lubricant system draining into the lubricant draining system.

2. The lubricated shaft bearing assembly set forth in claim 1 characterized in that the bearing is provided with a circumferential chamber to which the second lubricant system is connected, the bearing having large passages extending from the chamber to the exterior of the bearing whereby warmed lubricant delivered by the second lubricant system flows through the bearing and into the lubricant draining system.

3. The lubricated shaft bearing assembly set forth in claim 1 characterized in that the second lubricant system sprays the warmed lubricated fluid into the exterior of the bearing whereby, through heat transfer, lubricating fluid in the area between the shaft and the bearing is warmed.

4. The lubricated shaft bearing assembly of claim 3 characterized in that the lubricant supplying system, lubricant draining system and lubricant reservoir form a closed loop lubricating system, the closed loop system having a valve which can be positioned to permit flow from the lubricant supplying system into the second lubricant supplying system.

5. The lubricated shaft bearing assembly of claim 3 characterized in that the means closing the end of chamber is formed of an insulating material forming a heat barrier.

6. The lubricated shaft bearing assembly of claim 3 characterized in that a temperature sensing means is located in proximity of the bearing so that the temperature of the bearing may be determined.

7. The method of warming a lubricated bearing in a cryogenic machine to render the lubricating fluid operable prior to initial start-up of the machine, said method comprising: warming the lubricating fluid to be used in the lubrication of the bearing to a suitable temperature; flowing the warmed lubricating fluid over the outer surface of the lubricated bearing to warm the bearing and uncongeal lubricating fluid congealed therein; and draining off the lubricating fluid.

8. The method set forth in claim 5 characterized in that the temperature adjacent to the lubricated bearing is sensed to determine when the machine may be started and the supplying of lubricating fluid to the exterior of the bearing terminated.

References Cited
UNITED STATES PATENTS 2,388,523 11/1945 Buechel _____ 184—6
3,114,360 12/1963 Snelling _____ 184—6

HOUSTON S. BELL, Jr., *Primary Examiner.*

U.S. Cl. X.R.

123—196; 62—472; 184—6, 104